(12) United States Patent
Feldmann et al.

(10) Patent No.: US 9,512,734 B2
(45) Date of Patent: Dec. 6, 2016

(54) SEALING OF THE FLOW CHANNEL OF A TURBOMACHINE

(71) Applicant: MTU Aero Engines AG, Munich (DE)

(72) Inventors: Manfred Feldmann, Eichenau (DE); Norbert Schinko, Munich (DE); Sebastian Kaltenbach, Munich (DE); Joachim Lorenz, Altomuenster (DE)

(73) Assignee: MTU Aero Engines AG, Munich (DE)

( * ) Notice: Subject to any disclaimer, the term of this patent is extended or adjusted under 35 U.S.C. 154(b) by 606 days.

(21) Appl. No.: 13/960,455

(22) Filed: Aug. 6, 2013

(65) Prior Publication Data
US 2014/0044529 A1   Feb. 13, 2014

(30) Foreign Application Priority Data
Aug. 9, 2012  (EP) .................................... 12179772

(51) Int. Cl.
| | |
|---|---|
| *F01D 11/00* | (2006.01) |
| *F01D 9/04* | (2006.01) |
| *F01D 11/08* | (2006.01) |
| *F01D 11/12* | (2006.01) |
| *F01D 25/14* | (2006.01) |
| *F01D 25/24* | (2006.01) |

(52) U.S. Cl.
CPC ............... *F01D 11/001* (2013.01); *F01D 9/04* (2013.01); *F01D 11/08* (2013.01); *F01D 11/12* (2013.01); *F01D 25/145* (2013.01); *F01D 25/246* (2013.01); *Y02T 50/675* (2013.01)

(58) Field of Classification Search
CPC ...... F01D 11/08; F01D 25/246; F01D 11/005; F01D 11/24; F05B 2240/11
USPC ........................ 415/170.1, 173.1, 173.6, 229
See application file for complete search history.

(56) References Cited

U.S. PATENT DOCUMENTS

| | | | |
|---|---|---|---|
| 4,925,365 A | | 5/1990 | Crozet et al. |
| 5,131,813 A | * | 7/1992 | Przytulski ................. F01D 5/03 416/217 |
| 5,188,507 A | * | 2/1993 | Sweeney ................... B23H 9/10 415/170.1 |

(Continued)

FOREIGN PATENT DOCUMENTS

| | | |
|---|---|---|
| DE | 199 58 809 | 6/2001 |
| DE | 101 22 464 C1 | 3/2002 |

(Continued)

*Primary Examiner* — Patrick Maines
(74) *Attorney, Agent, or Firm* — Davidson, Davidson & Kappel, LLC

(57) ABSTRACT

A turbomachine having a flow channel and a housing radially surrounding the flow channel, a plurality of stationary and moving blades being situated in the flow channel, stationary blades being situated adjacent to the moving blades in the axial direction, and the stationary blades having at least one stationary blade hook which engages with at least one housing hook for the purpose of connecting the stationary blades to the housing. A sealing and lining element is situated in the radial direction between the moving blades adjacent to the stationary blades and the housing, and has a sealing structure interacting with blade tips of the moving blades. A heat protection element is provided in the area between the sealing and lining element and the housing, and a sealing element being situated on the heat protection element for the purpose of sealing contact with the housing hook.

17 Claims, 3 Drawing Sheets

(56) References Cited

U.S. PATENT DOCUMENTS

| | | | | |
|---|---|---|---|---|
| 5,201,846 | A * | 4/1993 | Sweeney | F01D 9/04 415/170.1 |
| 5,333,995 | A * | 8/1994 | Jacobs | F01D 25/246 415/173.1 |
| 6,918,743 | B2 * | 7/2005 | Gekht | F01D 9/04 415/139 |
| 7,334,984 | B1 * | 2/2008 | Stine | F01D 11/127 415/173.1 |
| 2004/0213666 | A1 * | 10/2004 | Gieg | F01D 25/246 415/170.1 |
| 2012/0247121 | A1 * | 10/2012 | Kitamura | F01D 11/24 60/785 |
| 2012/0288362 | A1 * | 11/2012 | Garin | F01D 25/246 415/177 |
| 2014/0140833 | A1 * | 5/2014 | Albers | F01D 5/225 415/191 |
| 2015/0102565 | A1 * | 4/2015 | Feldmann | F01D 25/246 277/591 |

FOREIGN PATENT DOCUMENTS

| | | | |
|---|---|---|---|
| DE | 100 48 156 | 4/2002 | |
| DE | 10048156 A1 * | 4/2002 | ........... F01D 25/246 |
| EP | 0 356 305 | 2/1990 | |
| EP | 0 618 349 | 10/1994 | |
| EP | 0 844 369 | 5/1998 | |
| EP | 1 106 785 | 6/2001 | |

\* cited by examiner

//SEALING OF THE FLOW CHANNEL OF A TURBOMACHINE

This claims the benefit of European Patent Application EP 12179772.4, filed Aug. 9, 2012 and hereby incorporated by reference herein.

The present invention relates to a turbomachine, in particular a thermal turbomachine such as a stationary gas turbine or an aircraft engine, having a flow channel and a housing which radially surrounds the flow channel, and in particular the sealing of the flow channel against the housing.

BACKGROUND

Thermal turbomachines such as gas turbines or jet engines have long been known. In these machines, a fluid is generated from combustion gases, with the aid of fuel combustion, this fluid driving rotors to rotation for the purpose of thereby generating energy or propulsion. The combustion gases in the flow channel usually have very high temperatures, so that lining elements, heat protection panels and/or cooling channels as well as insulating elements are provided between the flow channel and the housing of the turbomachine for the purpose of adjusting a steep temperature gradient from the flow channel to the housing.

Furthermore, the shell radially surrounding the flow channel must also ensure that fluid can possibly not escape from the flow channel, so that, if possible, all the combustion gases are available for driving the rotors. In certain circumstances, however, this is difficult to accomplish, due to the complex structure of the shell, including the housing, heat protection panels, lining elements and components for cooling air channels, since many different components must be connected to each other. As a result, gaps and cavities may easily form, through which both fluid may escape from the flow channel and cooling air may penetrate the flow channel. For this reason, it is important when designing the shell around the flow channel to make sure that sealing surfaces are provided between the individual components, which avoid leaks with regard to the flow channel.

A casing ring for a turbomachine, as illustrated in FIG. 1, is known from DE 101 22 464 C1. The turbomachine illustrated in FIG. 1 has a moving blade ring 11 which includes a shroud having two seal tips 13, 14, which interact with a run-in coating 6 in a honeycomb structure. Stationary blades 15, 16 are apparent upstream and downstream from moving blade ring 11, which are statically situated in housing 17 of the turbine as individual parts or as segments composed of multiple blades.

The radially outer end of stationary blade 15 is located in a groove 18 of housing 17 which is radially open to the inside and runs around housing 17. The radially outer end of stationary blade 16 engages with a groove 19 of housing 17 which is axially open to the rear and runs around housing 17, the area surrounding groove 19 also being referred to as the housing hook. Stationary blade 15 (on the left, outside the illustration) also has a comparable suspension. Casing ring 1 extends axially from stationary blade 15 to stationary blade 16 as well as around housing 17 in the circumferential direction. The casing ring has a segmented design. A seal carrier 3, which holds run-in coating 6 as part of the outer air seal (OAS), is situated on the hot gas side.

A securing element 7 is provided on the housing side, whose primary function is to secure stationary blade 15 against being released from groove 18. In addition to run-in coating 6, seal carrier 3 also includes a shell-like carrier part 4 and a stop part 5. Multiple seal carriers 3 of this type are positioned adjacent to each other over the circumference of the machine. Securing element 7 includes a C-shaped securing part 8 in the axial sectional view, which grips groove 18 with the aid of the stationary blade end, a shell-type shielding section 9 and a stop part 10, which resembles a hook in the axial cross-sectional view. Elements 3 and 7, which are spaced as far apart as possible, have defined contact points C1, C2 whose extension is minimized with regard to minimal heat conduction, e.g., with the aid of periodic interruptions in the circumferential direction, which, however, are necessary for mutual support.

The illustrated configuration is problematic in that the sealing effect of stop part 5 decreases during operation, and gaps are able to form between stop part 5 and housing hook 19, which may result in the loss of flowing fluid.

SUMMARY OF THE INVENTION

It is an object of the present invention to provide a turbomachine and, in particular, a seal assembly therefor, which remedies the problem according to the prior art and which facilitates a possibly good sealing of the flow channel of a turbomachine against a housing surrounding the flow channel.

The present invention is based on the finding that a sealing effect of a stop element, as demonstrated in DE 101 22 464 C1, may be lost due to the fact that a shifting of the stop element occurs during operation at high temperatures due to thermal expansion, so that the sealing effect deteriorates.

The present invention provides that the sealing element for sealing contact with the housing of a thermal turbomachine is not being situated on a sealing and lining element which is in direct contact with the flow channel but rather on a heat protection element situated therebehind. The influence of the thermal expansion may be reduced thereby.

In addition, the sealing element may be situated in a radially clamped manner, so that the sealing effect may be maintained even during thermal expansion.

The sealing element may be designed as an element which is additionally situated on the heat protection element or as an elongation of the heat protection element, the heat protection element being correspondingly shaped.

The sealing element may be designed as an elastic body which abuts the housing under pretension. In particular, the sealing element may be designed in the form of a spring element, so that the form of the spring element supports the elastic contact of the sealing element with the housing.

The heat protection element is usually situated radially surrounding the flow channel in multiple segments or in the form of multiple heat protection elements. To achieve a good sealing effect, the sealing element may also be situated completely radially surrounding the flow channel and, in particular, it may have the same circumferential length as the heat protection element.

In the same way as multiple heat protection elements, multiple sealing elements may also be provided circumferentially in the circumferential direction, and just like the heat protection elements, the sealing elements may be designed to overlap for the purpose of preventing leaks at corresponding circumferential joints. The overlapping may be in the form of so-called shiplaps.

The heat protection elements having the sealing elements may be situated offset from the sealing and lining elements, which may also be situated radially surrounding the flow channel in the form of multiple segments. It is thus possible to use the heat protection elements to implement both a sealing against the housing and a segment joint sealing of the sealing and lining elements.

To cope with potential areas for leaks by minimizing the joints along the circumference, the smallest possible number of heat protection elements should be selected; in particular 5 or fewer heat protection elements, preferably 3 or fewer heat protection elements should be provided for a circumference.

BRIEF DESCRIPTION OF THE DRAWINGS

The appended drawings show a purely schematic representation as follows.

DETAILED DESCRIPTION

Additional advantages, characteristics and features of the present invention are clarified in the following detailed description of an exemplary embodiment on the basis of the appended drawings. However, the present invention is not limited to this exemplary embodiment.

Figure 1:
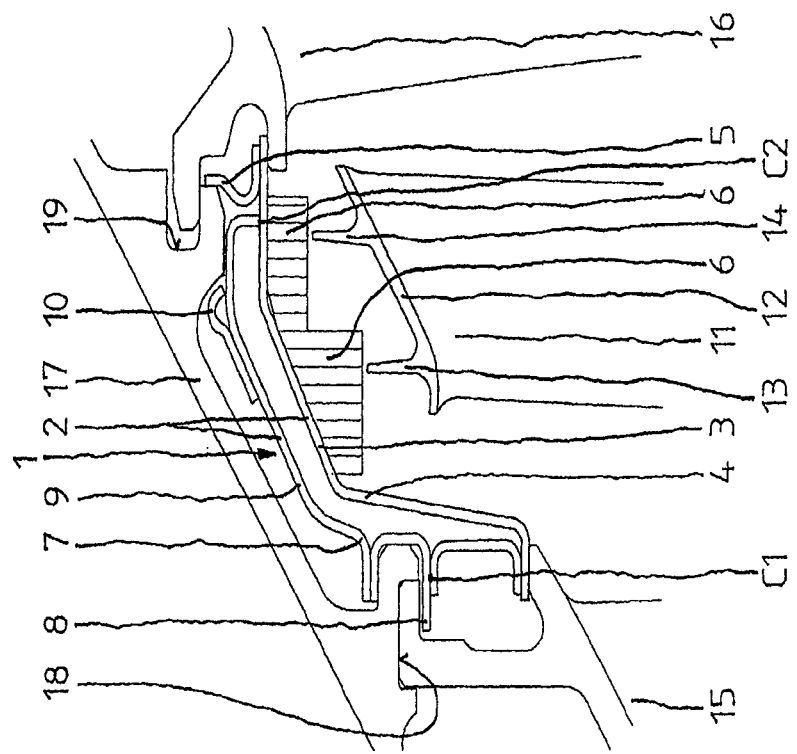
FIG. 1 shows a partial cross-sectional (axial sectional) view of a turbomachine according to the prior art.
Figure 2:
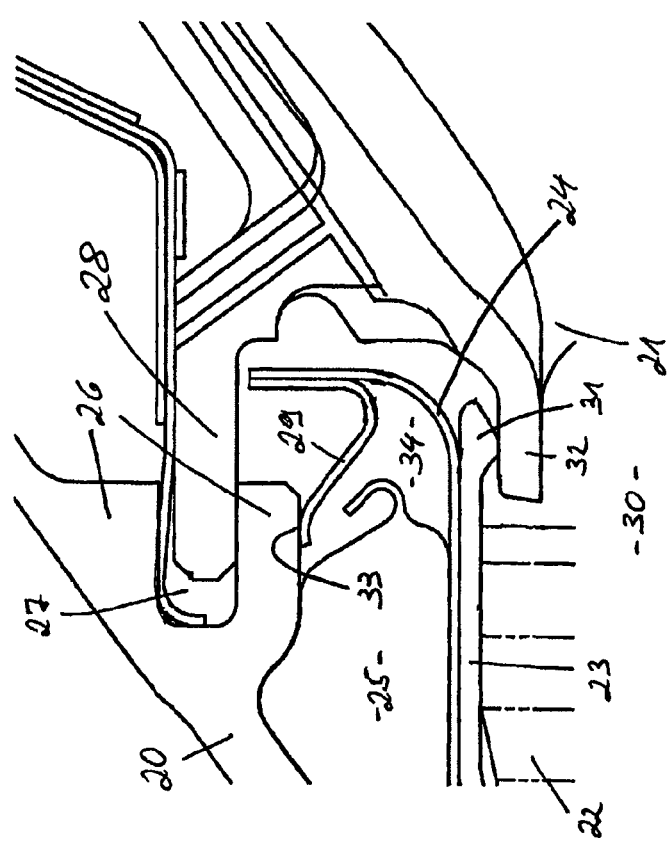
FIG. 2 shows a partial cross-sectional (axial sectional) view of a turbomachine according to the present invention.

In a representation similar to FIG. 1, FIG. 2 shows an axial sectional view of a turbomachine according to the present invention, one part of housing 20 and one part of stationary blade assembly 21 being visible, which may be used in a low-pressure turbine of an aircraft engine. Stationary blade assembly 21 has a stationary blade hook 28, which engages with a groove 27 of housing 21, which is formed by a housing hook 26.

Housing 20 surrounds a flow channel 30, housing 20 surrounding flow channel 30 radially circumferentially in the circumferential direction. Stationary blade assembly 21 extends radially into flow channel 30 for the purpose of guiding the fluid flowing in flow channel 30, e.g., combustion gases, accordingly and conducting it to adjacent moving blades (not illustrated), or for the purpose of conducting the fluid coming from a moving blade ring to the next moving blade ring.

In the turbomachine illustrated in FIG. 2, similarly to the illustration in FIG. 1, a moving blade ring (not illustrated) is provided in the area of sealing structure 22, which is formed by a run-in coating. Run-in coating 22 interacts with seal tips of the moving blades, which may grind into the run-in coating during operation. Run-in coating 22 is situated on a sealing and lining element 23, a so-called liner segment, which, together with a sealing tab 31, abuts a shroud 32 of stationary blade assembly 21 for the purpose of sealing flow channel 30.

A heat protection element 24 in the form of a heat protection panel as well as insulation 25 is provided downstream from sealing and lining element 23 radially in the direction of housing 20. A cross-sectional L-shaped or slightly S-shaped spring element 29 is situated on the heat protection panel as a sealing element, which abuts the housing hook and presses against the housing hook with the aid of elastic pretension. This forms a sealing area 33 between housing hook 26 and sealing element 29, which induces a sealing of cavity 34 between housing 20 and sealing and lining element 23, which is also referred to as the OAS cavity (outer air seal cavity). The arrangement of sealing element 29 on heat protection element 24 results in a lower temperature load for sealing element 29 during operation, since no direct heat conduction from sealing and lining element 23 to sealing element 29 is able to take place. As a result, the risk of plastic deformation or creep deformation of sealing element 29 is reduced. In turn, this improves the ability to maintain the elastic properties of the sealing element and thus the contact pressure of sealing element 29 on housing hook 26 even during operation, so that the sealing effect is better maintained during operation.

Furthermore, the sealing element is situated in such a way that the sealing effect is assisted by the pressure load.

Figure 3:
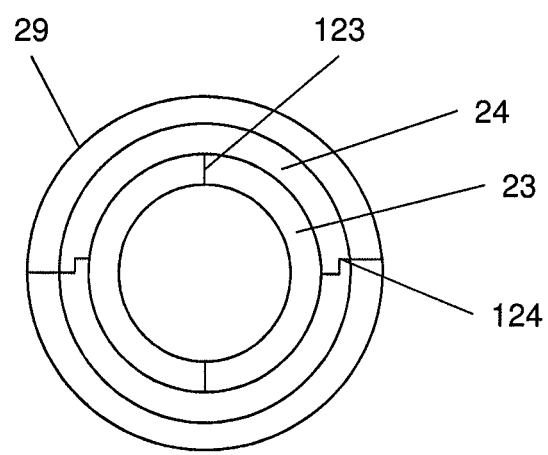
FIG. 3 shows a highly schematized cross-sectional (circumferential sectional) view of a turbomachine of the present invention.

FIG. 3 shows a highly schematized view with a plurality of sealing and lining elements 23 spaced circumferentially and forming joints 123. The heat protection elements 24 cover the joints and overlap at 124, and each support a further seal 29. Heat protection elements 24 and insulation 25 may be formed of a material having higher thermal resistance properties than further seal 29, for example not expanding or deteriorating as much as further seal 29 in response to a certain temperature rise, and/or also not transferring heat at as high a rate as, and/or dissipating heat better than, a material of further seal 29.

Although the present invention was described in detail on the basis of the exemplary embodiment, it is a matter of course to those skilled in the art that the present invention is not limited to this exemplary embodiment, but instead modifications are possible in such a way that individual features may be omitted or different combinations of features may be implemented, provided that this does not depart from the scope of protection of the appended claims.

What is claimed is:

1. A turbomachine having a flow channel and comprising:
a housing radially surrounding the flow channel having at least one housing hook;
a plurality of stationary and moving blades situated in the flow channel, the stationary blades being situated adjacent to the moving blades in an axial direction, and the stationary blades having at least one stationary blade hook engaging with the housing hook for the purpose of connecting the stationary blades to the housing;
at least one liner situated in a radial direction between the moving blades adjacent to the stationary blades and the housing, the liner having a seal interacting with blade tips of the moving blades;
at least one heat protector being in an area of the liner between the liner and the housing; and
a further seal situated on the heat protector to create sealing contact with the housing hook,
the heat protector having a higher thermal resistance than the further seal, wherein the heat protector is made of a material having higher thermal resistance properties than the further seal.

2. The turbomachine as recited in claim 1 wherein the further seal is situated in a radially clamped manner.

3. The turbomachine as recited in claim 1 wherein the further seal is formed by an elongation of the heat protector or provided as an additionally situated element.

4. The turbomachine as recited in claim 1 wherein the further seal is designed as an elastic body abutting the housing hook under a pretension.

5. The turbomachine as recited in claim 1 wherein the further seal is a spring element supporting elastic contact of the further seal with the housing hook.

6. The turbomachine as recited in claim 1 wherein the further seal extends over a circumferential length of the heat protector.

7. The turbomachine as recited in claim 1 wherein the sealing effect of the further seal is additionally assisted by a pressure load.

8. The turbomachine as recited in claim 1 wherein the at least one heat protector includes a plurality of heat protectors along the circumference of the flow channel.

9. The turbomachine as recited in claim 1 wherein adjacent heat protectors of the at least one heat protector are designed to overlap each other.

10. The turbomachine as recited in claim 1 wherein the at least one heat protector covers a joint between two circumferentially adjacent liners of the at least one liner.

11. The turbomachine as recited in claim 1 wherein fewer than five heat protectors of the at least one heat protector are provided circumferentially along the circumference of the flow channel.

12. The turbomachine as recited in claim 11 wherein fewer than three of the heat protectors are provided circumferentially.

13. The turbomachine as recited in claim 11 wherein the heat protector includes a heat protection panel.

14. The turbomachine as recited in claim 13 wherein the heat protector further includes insulation.

15. The turbomachine as recited in claim 11 further comprising a sealing tab on the liner for sealing contact with the stationary blades.

16. The turbomachine as recited in claim 11 wherein the heat protector has a lower heat transfer rate than the further seal.

17. The turbomachine as recited in claim 11 wherein the heat protector has a lower thermal expansion than the further seal.

* * * * *